(12) United States Patent
Park et al.

(10) Patent No.: US 8,559,435 B2
(45) Date of Patent: Oct. 15, 2013

(54) METHOD AND APPARATUS OF TRANSMITTING CONTROL INFORMATION FOR MULTICAST BROADCAST SERVICE

(75) Inventors: Hyung Ho Park, Anyang-si (KR); Suk Woo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 281 days.

(21) Appl. No.: 13/123,892

(22) PCT Filed: Oct. 14, 2009

(86) PCT No.: PCT/KR2009/005901
§ 371 (c)(1),
(2), (4) Date: Apr. 12, 2011

(87) PCT Pub. No.: WO2010/044600
PCT Pub. Date: Apr. 22, 2010

(65) Prior Publication Data
US 2011/0182229 A1    Jul. 28, 2011

Related U.S. Application Data

(60) Provisional application No. 61/142,638, filed on Jan. 6, 2009, provisional application No. 61/141,215, filed on Dec. 29, 2008, provisional application No. 61/105,802, filed on Oct. 15, 2008.

(51) Int. Cl.
*H04L 12/28* (2006.01)
*H04L 12/56* (2011.01)

(52) U.S. Cl.
USPC .......................................... 370/392; 370/400

(58) Field of Classification Search
None
See application file for complete search history.

(56) References Cited

U.S. PATENT DOCUMENTS

| | | | | |
|---|---|---|---|---|
| 6,839,565 B2 * | 1/2005 | Sarkkinen et al. | ............. | 455/503 |
| 7,620,061 B2 * | 11/2009 | Yi et al. | ......................... | 370/432 |
| 7,706,318 B2 * | 4/2010 | Lee et al. | ...................... | 370/322 |
| 8,068,843 B2 * | 11/2011 | Yi et al. | ......................... | 455/450 |
| 8,139,524 B2 * | 3/2012 | Lee et al. | ...................... | 370/328 |
| 8,254,299 B2 * | 8/2012 | Kim | .............................. | 370/312 |
| 8,270,332 B2 * | 9/2012 | Aoyama et al. | ................ | 370/312 |
| 2006/0050742 A1 | 3/2006 | Grandhi et al. | | |
| 2008/0025240 A1 | 1/2008 | Casaccia et al. | | |
| 2008/0101326 A1 | 5/2008 | Zhang et al. | | |
| 2009/0046617 A1 * | 2/2009 | Tenny et al. | ................... | 370/312 |
| 2010/0234034 A1 * | 9/2010 | Aoyama et al. | ................ | 455/450 |
| 2011/0016350 A1 * | 1/2011 | Cho et al. | ........................ | 714/4.1 |
| 2011/0069672 A1 * | 3/2011 | Lee et al. | ....................... | 370/330 |

FOREIGN PATENT DOCUMENTS

| WO | 2007-078164 A1 | 7/2007 |
|---|---|---|
| WO | WO 2008/053686 | * 5/2008 |

* cited by examiner

*Primary Examiner* — Eunsook Choi
(74) *Attorney, Agent, or Firm* — Lee, Hong, Degerman, Kang & Waimey

(57) ABSTRACT

A method and an apparatus for transmitting control information for multicast broadcast service (MBS) is provided. The method includes configuring one cell specific control channel for carrying cell specific control information; configuring at least one non-cell specific control channel for carrying non-cell specific control information; and transmitting the cell specific control channel and the non-cell specific control channel to a mobile station.

8 Claims, 9 Drawing Sheets

METHOD AND APPARATUS OF TRANSMITTING CONTROL INFORMATION FOR MULTICAST BROADCAST SERVICE

CROSS-REFERENCE TO RELATED APPLICATIONS

This application is a 371 U.S. national stage application of International Application No. PCT/KR2009/005901, filed on Oct. 14, 2009, which claims priority to U.S. Provisional Application Ser. Nos. 61/142,638, filed on Jan. 6, 2009, 61/141,215, filed on Dec. 29, 2008, and 61/105,802, filed on Oct. 15, 2008, the contents of which are incorporated by reference herein in their entirety.

TECHNICAL FIELD

The present invention relates to wireless communication and, more particularly, to a multicast and broadcast service (MBS).

BACKGROUND ART

A wireless communication system is being extensively developed to provide various types of communication services such as voice, data, and the like. In general, the wireless communication system is a multi-access system capable of supporting communication with multiple users by sharing available radio resources (bandwidth, transmission power, etc.). Examples of the multi-access system include a code division multiple access (CDMA) system, a frequency division multiple access (FDMA) system, an orthogonal frequency division multiple access (OFDMA) system, a single carrier-frequency division multiple access (SC-FDMA) system, and the like.

IEEE (Institute of Electrical and Electronics Engineers) 802.16 standard provides techniques and protocols to support a broadband wireless access. Standardization started from 1999 and IEEE 802.16-2001 was approved in 2001. It is based on a single carrier physical layer called 'WirelessMAN-SC'. Later, besides the 'WirelessMAN-SC', 'WirelessMAN-OFDM' and 'WirelessMAN-OFDMA' were added to a physical layer in IEEE 802.16a standard approved in 2003. After the IEEE 802.16a standard was completed, a revised IEEE 802.16-2004 standard was approved in 2004. IEEE 802.16-2004/Cor1 (referred to as 'IEEE 802.16e', hereinafter) was finalized in the form of 'corrigendum' in 2005 in order to resolve and correct bugs and errors of the IEEE 802.16-2004 standard. A standard based on the IEEE 802.16-2004/Cor1 is called IEEE802.16e or WiMAX. Currently, the IEEE 802.16 broadband wireless access working group is conducting standardization of an IEEE 802.16m, a new technical standard, based on the IEEE 802.16e.

The IEEE 802.16 wireless communication system provides a high speed multimedia communication service to users beyond the conventional voice and packet data communication service. The multimedia communication service is a service for simultaneously transmitting data packets to multiple user equipments (UEs), which is called by other names such as broadcast/multicast service, multimedia broadcast multicast service (MBMS), multicast and broadcast service (MBS), enhanced multicast broadcast service (EMBS), or point-to-multipoint service. In the description of the present invention, such terms are mixedly used. In the MBS, an IP multicast-based service, UEs receive the same multimedia data by sharing resources required for transmission of data packets. Thus, resource efficiency can be enhanced.

MBS can be classified into two types of services. The first type of MBS is based on a single-base station (BS) access scheme in which the MBS is provided by a single BS in a single cell. The examples of this type of service include a mobile TV, emergency alert, home network, intra-office broadcasting, and the like. The second type of MBS is based on a multi-BS access scheme in which several BSs form a single MBS zone to provide an MBS service. Namely, several BSs are allocated the same burst from an MBS server in multiple cells within the same MBS zone by using a single MBS zone ID and provide an MBS service. Thus, a service continuity and macro-diversity gain can be attained without performing handover in case of an inter-cell movement including BSs.

Control information for the MBS is transmitted via a multicast service control channel (MSCCH). In the description of the present invention, the MSCCH may be mixedly used with a multicast broadcast control channel, an MBS MAP, an enhanced multicast broadcast service (E-MBS) MAP, and the like. If every control information related to the two types of MBSs is transmitted via a single MSCCH, the operation would be simple. In this case, however, information irrelevant to a corresponding cell may be received, a signaling overhead is large, and there is a limitation in a modulation and coding scheme (MCS) level. Thus, a method for effectively transmitting the control information for the MBS is required.

DISCLOSURE OF INVENTION

Technical Problem

Therefore, an object of the present invention is to provide a method and an apparatus for effectively transmitting control information for a multicast broadcast service (MBS).

Solution to Problem

According to an aspect of the present invention, a method for transmitting a control channel for a multicast and broadcast service (MBS) is provided. The method includes configuring one cell specific control channel for carrying cell specific control information, configuring at least one non-cell specific control channel for carrying non-cell specific control information, and transmitting the cell specific control channel and the non-cell specific control channel to a mobile station. The cell specific control channel may comprise a plurality of joint-coded cell specific control information. The non-cell specific control channel may be separately configured for each MBS. The cell specific control channel and the non-cell specific control channel may be indicated by a control channel indicator, respectively. The control channel indicator may comprise at least one of scheduling information, MBS notification information, and a modification flag with respect to the cell specific control channel and the non-cell specific control channel. The control channel indicator may be transmitted via a superframe header (SFH).

According to another aspect of the present invention, a method of receiving a multicast and broadcast service (MBS) by a mobile station is provided. The method includes receiving a control channel indicator, receiving at least one of a cell specific control channel for carrying cell specific control information and at least one non-cell specific control channel for carrying non-cell specific control information based on the control channel indicator, and receiving an MBS indicated by the at least one control channel. The cell specific control channel may comprise a plurality of joint-coded cell specific control information. The non-cell specific control channel may be separately configured for each MBS.

According to another aspect of the present invention, a mobile station is provided. The mobile station includes a processor, and a radio frequency (RF) unit connected with the processor and transmitting and receiving a radio signal, wherein the processor is configured to receive a control channel indicator, receive at least one of a cell specific control channel for carrying cell specific control information and at least one non-cell specific control channel for carrying non-cell specific control information based on the control channel indicator, and receive an MBS indicated by the at least one control channel.

Advantageous Effects of Invention

According to exemplary embodiments of the present invention, control information for an MBS can be effectively transmitted. In particular, the efficiency of resource utilization can be enhanced, power can be saved in terms of UE, and an MCS level can be adaptively applied.

MODE FOR THE INVENTION

The following technique may be used in various multiple access schemes such as a code division multiple access (CDMA) scheme, a frequency division multiple access (FDMA) scheme, a time division multiple access (TDMA) scheme, an orthogonal frequency division multiple access (OFDMA) scheme, a single carrier-frequency division multiple access (SC-FDMA) scheme, and the like. The CDMA may be implemented by a radio technology such as CDMA2000. The TDMA may be implemented by a radio technology such as a global system for mobile communications (GSM)/general packet radio service (GPRS)/enhanced data rates for GSM evolution (EDGE). The OFDMA may be implemented by radio technology such as IEEE (Institute of Electrical and Electronics Engineers) 802.11 (Wi-Fi), IEEE 802.16 (WiMAX), IEEE 802.20, E-UTRA (Evolved UTRA), and the like. The UTRA is a part of a universal mobile telecommunications system (UMTS). 3GPP (3rd Generation, Partnership Project) LTE (Long Term Evolution) is a part of an evolved UMTS using the E-UTRA, which employs the OFDMA in downlink and the SC-FDMA in uplink. IEEE 802.16m is an evolution of the IEEE 802.16e.

For clarification, the following description will be centered on IEEE 802.16m, but the technical idea of the present invention is not meant to be limited thereto.

Figure 1:
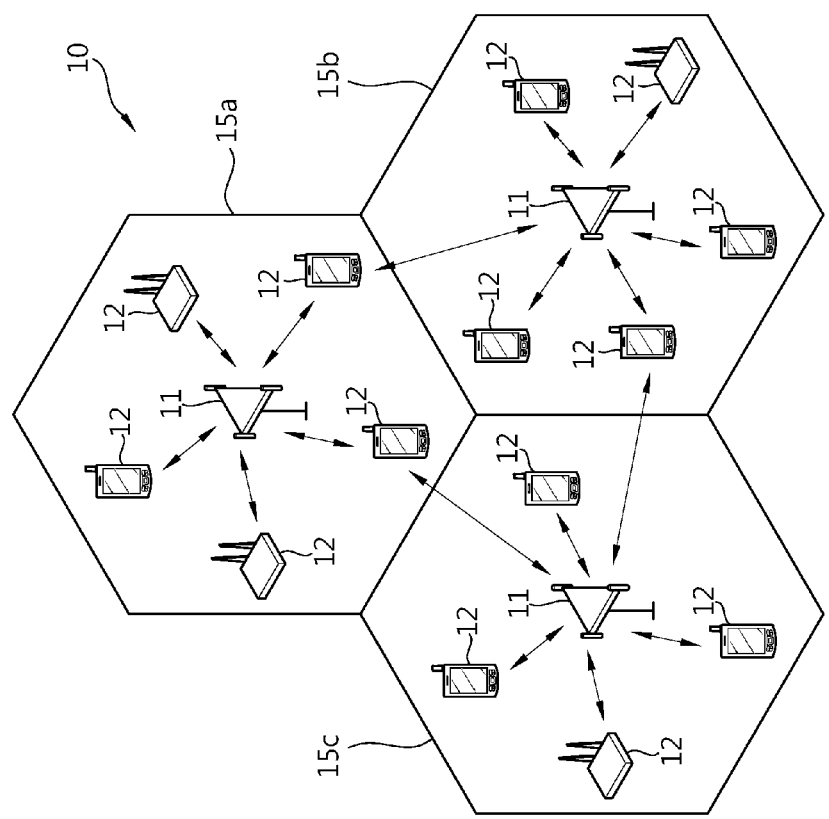
FIG. 1 illustrates a wireless communication system.

FIG. 1 illustrates a wireless communication system.

With reference to FIG. 1, the wireless communication system 10 includes at least one base station (BS) 11. Each BS 11 provides a communication service to particular geo-graphical areas (which are generally called cells). Each cell may be divided into a plurality of areas (which are called sectors). A mobile station (MS) 12 may be fixed or mobile, and may be referred to by other names such as user equipment (UE), user terminal (UT), subscriber station (SS), wireless device, personal digital assistant (PDA), wireless modem, handheld device, etc. The BS 11 generally refers to a fixed station that communicates with the MS 12 and may be called by other names such as evolved-node B (eNB), base transceiver system (BTS), access point (AP), etc.

An MS may belong to a single cell, and the cell to which the MS belong is called a serving cell. A BS that provides a communication service to the serving cell is called a serving BS. A wireless communication system is a cellular system, so there exists another cell adjacent to the serving cell. Another cell adjacent to the serving cell is called a neighbor cell. A BS that provides a communication service to the neighbor cell is called a neighbor BS. The serving cell and the neighbor cell are relatively determined based on the MS. When the MS moves from the serving cell to the neighbor cell so it is currently located in the neighbor cell, the neighbor cell in which the MS is located should be changed to a serving cell so as to continuously provide a service to the MS. A procedure of changing the serving cell of the MS due to the movement of the MS is called handover.

Hereinbelow, downlink (DL) refers to communication from the BS 11 to the MS 12, and uplink (UL) refers to communication from the MS 12 to the BS 11. In the downlink, a transmitter may be a part of the BS 11 and a receiver may be a part of the MS 11. In the uplink, a transmitter may be a part of the MS 12 and a receiver may be a part of the BS 11.

The wireless communication system may employ time division duplex (TDD), frequency division duplex (FDD), or half-duplex FDD (H-FDD) as a duplex scheme.

Figure 2:
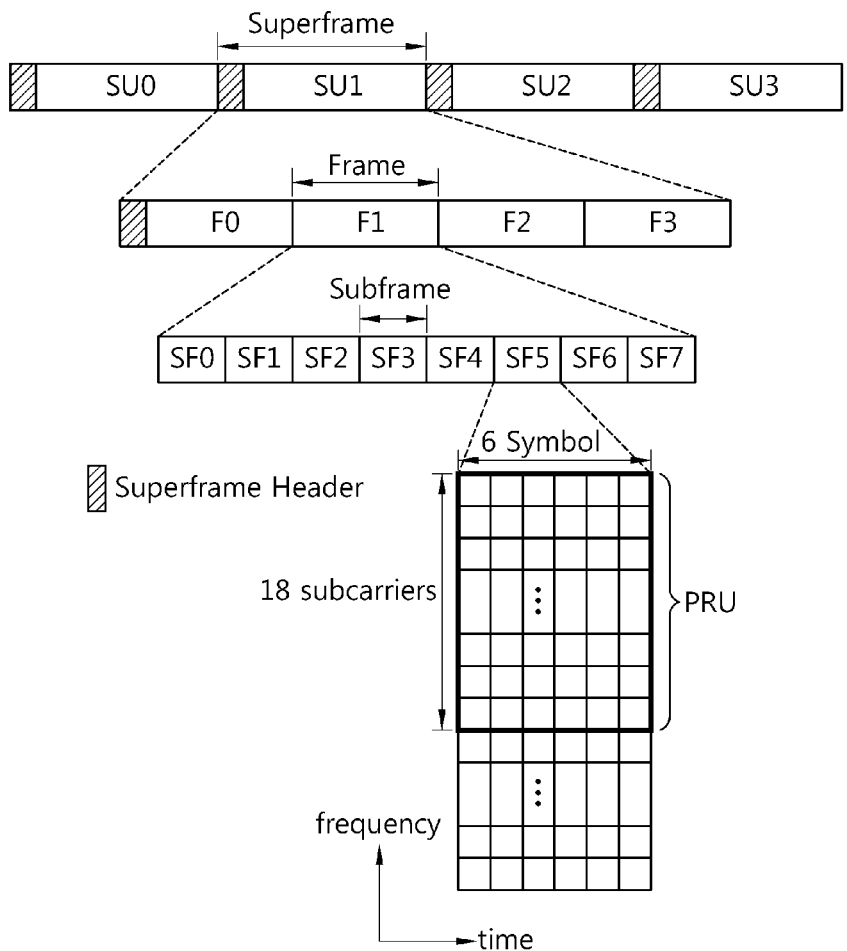
FIG. 2 illustrates an example of a structure of a superframe in an IEEE 802.16m system.

FIG. 2 illustrates an example of a structure of a superframe in an IEEE 802.16m system.

With reference to FIG. 2, each of superframes SU0, SU1, SU2, and SU3 includes a superframe header (SFH) and four frames (F0, F1, F2, and F3). Each frame in the superframe may have the same length. For example, each superframe may have a length of 20 ms and each frame may have a length of 5 ms. A single frame includes eight subframes (SF0, SF1, . . . , SF7). Each subframe may be allocated for uplink or downlink transmission.

The superframe header (SFH) carries an essential system parameter and system configuration information. The SFH may be positioned within a first subframe of the superframe.

The SFH may be classified into a primary-SFH (P-SFH) and a secondary-SFH (S-SFH). The P-SFH is transmitted at every superframe. The S-SFH may be transmitted at every superframe.

The structure of the superframe is merely illustrative. The length of the superframe, the number of frames included in the superframe, and the number of subframes included in the frame may vary. The number of subframes included in the frame may vary depending on a channel bandwidth and a cyclic prefix (CP).

A single subframe includes a plurality of orthogonal frequency division multiplexing (OFDM) symbols in a time domain, and a plurality of subcarriers in a frequency domain. An OFDM symbol, representing a single symbol period, may be called by other names such as an OFDMA symbol, an SC-FDMA symbol, and the like. Here, a single subframe is illustrated to include six OFDM symbols (S0, S1, . . . , S5) in the time domain, but the number of OFDM symbols within the subframe is not limited thereto. The type of a subframe may be defined by the number of OFDM symbols included in the subframe. For example, if a subframe includes six OFDM symbols it may be defined as a type-1 subframe. If a subframe includes seven OFDM symbols, it may be defined as a type-2 subframe. If a subframe includes five OFDM symbols, it may be defined as a type-3 subframe. If a subframe includes nine OFDM symbols, it may be defined as a type-4 subframe. A single frame may include all the same type of subframes. Or, a single frame may include different types of subframes. Namely, each subframe of a single frame may have the same number of OFDM symbols or a different number of OFDM symbols. Alternatively, the number of OFDM symbols of at least one subframe within a single frame may be different from the number of OFDM symbols of the other remaining subframes within the single frame.

A single OFDM symbol includes a plurality of subcarriers, and the number of subcarriers is determined depending on the size of an FFT. There are several types of subcarriers: a data subcarrier for transmitting data; a pilot subcarrier for making various estimations, and a null carrier for a guard band and a DC carrier. Parameters featuring OFDM symbols include BW, $N_{used}$, n, G, etc. BW is a nominal channel bandwidth. $N_{used}$ is the number of used subcarriers (including DC subcarriers). 'n' is a sampling factor. This parameter may be combined with BW and $N_{used}$ to determine subcarrier spacing and useful symbol time. 'G' is a ratio of a CP time and a useful time.

Table 1 below shows OFDMA parameters.

TABLE 1

| | | | | | | |
|---|---|---|---|---|---|---|
| Nominal channel bandwidth, BW(MHz) | | 5 | 7 | 8.75 | 10 | 20 |
| Sampling factor, n | | 28/25 | 8/7 | 8/7 | 28/25 | 28/25 |
| Sampling frequency, Fs(MHz) | | 5.6 | 8 | 10 | 11.2 | 22.4 |
| FFT size, $N_{FFT}$ | | 512 | 1024 | 1024 | 1024 | 2048 |
| Subcarrier spacing, Δf(kHz) | | 10.94 | 7.81 | 9.77 | 10.94 | 10.94 |
| Useful symbol time, Tb(us) | | 91.4 | 128 | 102.4 | 91.4 | 91.4 |
| CP ratio, G = 1/8 | OFDMA symbol time, Ts(us) | 102.857 | 144 | 115.2 | 102.857 | 102.857 |
| | Number of OFDMA symbols per 5 ms frame for FDD | 48 | 34 | 43 | 48 | 48 |
| | Idle time(us) for FDD | 62.857 | 104 | 46.40 | 62.857 | 62.857 |
| | Number of OFDMA symbols per 5 ms frame for TDD | 47 | 33 | 42 | 47 | 47 |
| | TTG + RTG(us) for TDD | 165.714 | 248 | 161.6 | 165.714 | 165.714 |
| CP ratio, G = 1/16 | OFDMA symbol time, Ts(us) | 97.143 | 136 | 108.8 | 97.143 | 97.143 |
| | Number of OFDMA symbols per 5 ms frame for FDD | 51 | 36 | 45 | 51 | 51 |
| | Idle time(us) for FDD | 45.71 | 104 | 104 | 45.71 | 45.71 |
| | Number of OFDMA symbols per 5 ms frame for TDD | 50 | 35 | 44 | 50 | 50 |
| | TTG + RTG(us) for TDD | 142.853 | 240 | 212.8 | 142.853 | 142.853 |
| CP ratio, G = 1/4 | OFDMA symbol time, Ts(us) | 114.286 | 160 | 128 | 114.286 | 114.286 |
| | Number of OFDMA symbols per 5 ms frame for FDD | 43 | 31 | 39 | 43 | 43 |
| | Idle time(us) for FDD | 85.694 | 40 | 8 | 85.694 | 85.694 |
| | Number of OFDMA symbols per 5 ms frame for TDD | 42 | 30 | 38 | 42 | 42 |
| | TTG + RTG(us) for TDD | 199.98 | 200 | 136 | 199.98 | 199.98 |
| Number of guard subcarries | Left | 40 | 80 | 80 | 80 | 160 |
| | Right | 39 | 79 | 79 | 79 | 159 |
| Number of used subcarriers | | 433 | 865 | 865 | 865 | 1729 |
| Number of physical resource unit(18 × 6) in a type-1 subframe | | 24 | 48 | 48 | 48 | 96 |

In Table 1, $N_{FFT}$ has the smallest power of two greater than $N_{used}$, a sampling factor $F_s$=floor(n·BW/8000)×8000, subcarrier spacing $\Delta f=F_s/N_{FFT}$, useful symbol time $T_b=1/\Delta f$, a CP time $T_g=G\cdot T_b$, an OFDMA symbol time $T_s=T_b+T_g$, and a sampling time is $T_b/N_{FFT}$.

Each subframe includes a plurality of physical resource units (PRUs) in the frequency domain. A PRU, a basic physical unit for resource allocation, includes a plurality of contiguous OFDM symbols in the time domain and a plurality of contiguous subcarriers in the frequency domain. For example, the number of subcarriers in a PRU may be 18. The number of OFDM symbols in the PRU may be equal to the number of OFDM symbols included in a subframe. Accordingly, if the subframe includes six OFDM symbols, its PRU may include six OFDM symbols and 18 subcarriers.

Figure 3:
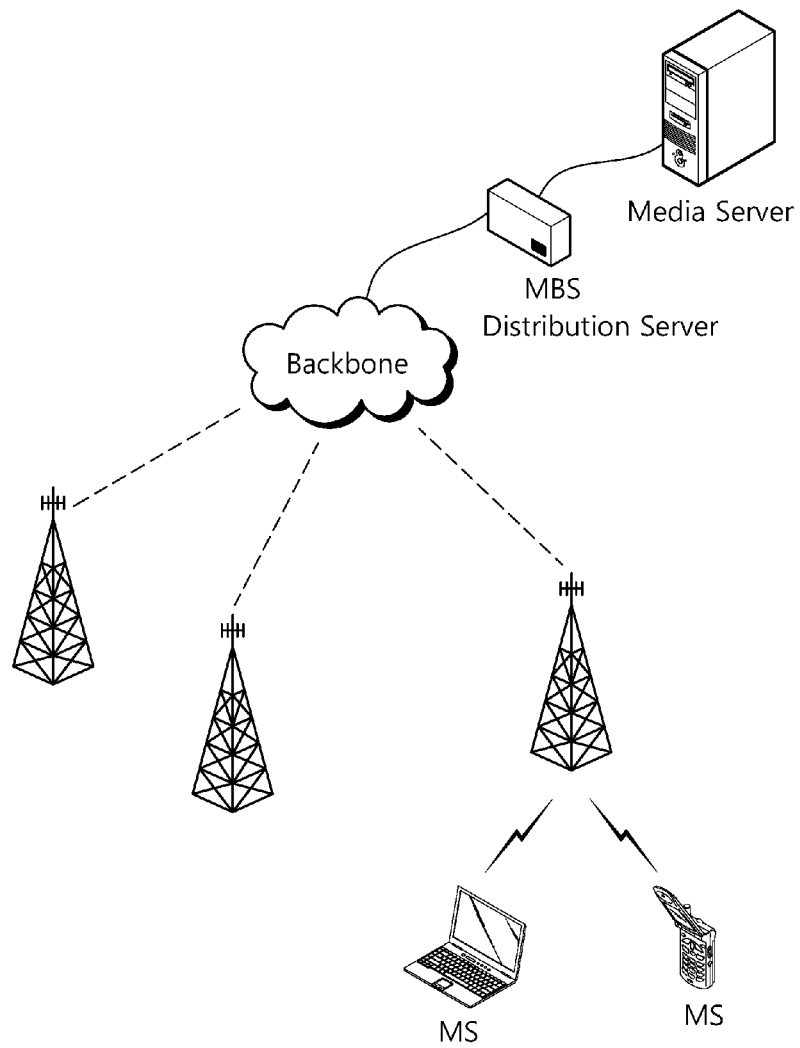
FIG. 3 illustrates an example of a reference model of an MBS in a broadband wireless communication system.

FIG. 3 illustrates an example of a reference model of an MBS in a broadband wireless communication system.

With reference to FIG. 3, an MBS network includes an MBS media server, an MBS distribution server, one or more BSs, and one or more MSs. The MBS media server provides MBS data to the BSs and performs UE authentication and encryption key distribution with respect to MBS contents. The MBS distribution server schedules the MBS data to be provided to the plurality of BSs. The MBS distribution server may be selectively omitted and the MBS media server may serve to schedule the MBS data. Each BS provides the MBS data which has been received via a backbone network to the MSs via a radio interface, and each MS receives the MBS data from the BSs.

The MBS in the broadband wireless communication system has the following characteristics.

1) Minimization of power consumption: Power consumption of the MS can be minimized while receiving the MBS data regardless of a current operation mode (e.g., a normal operation mode, a sleep mode, and an idle mode).

2) Mobility: The MS may be provided with the MBS connection seamlessly even when it moves between BSs.

3) MBS zone: The MBS contents are transmitted through the MBS zones which are locally divided, and MBS configuration information (e.g., an MBS connection identifier, an encryption key, a service identifier, etc.) may be configured differently at mutually different MBS zones.

4) Security: MBS contents are delivered only to authenticated users. An encryption key with respect to a MAC PDU of MBS data is applied in the same manner to BSs within an MBS zone.

The MBS zone will now be described.

MBS-related parameters (e.g., a security key, a multicast connection identifier, etc.) may be set to be different according to areas, and MBS contents may be broadcast only within a limited area. Thus, when an MS that receives the MBS contents moves to a different BS or performs handover, the MS must determine whether or not stored MBS information is valid and whether or not MBS contents can be continuously received.

If a current BS provides MBS through a parameter different from that of the MBS information retained by the MS, or if the current BS does not transmit MBS contents, the MS should be connected to a new BS to update the parameter with respect to the MBS contents. Thus, in order to solve this problem, the broadband wireless communication system operates an MBS zone formed by grouping one or more MBS providing BSs.

The BSs within the same MBS zone transmit MBS contents to MSs by using the same MBS parameter. In addition, in order for the MS to recognize the MBS zone, the BSs transfers an MBS zone ID to the MS. The MS can immediately check whether or not the currently retained MBS parameter is valid.

In addition, when the MS moves to another BS within the same MBS zone, the MS does not need to perform a procedure for resetting the MBS-related parameter to receive MBS data. The BSs within the same MBS zone transmit the MBS data at the same time by using the same radio resource, an MBS data reception efficiency of MSs can be increased through macro-diversity.

Figure 4:
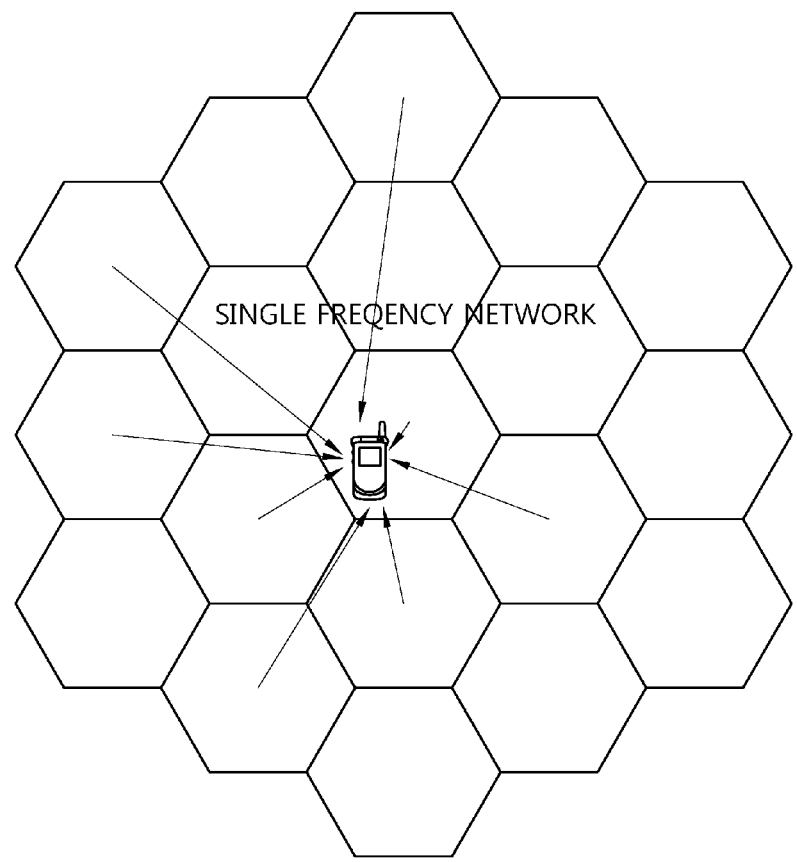
FIG. 4 is a conceptual view of providing a broadcast/multicast service by using macro-diversity.

FIG. 4 is a conceptual view of providing a broadcast/multicast service by using macro-diversity. A macro-diversity operation mode may be called a multicast broadcast single frequency network (MBSFN).

With reference to FIG. 4, an MBS zone to which an SFN is applied is illustrated. The MBS zone guarantees macro-diversity combining signals from multiple cells and is in synchronization at a symbol level for a high cell edge performance. Accordingly, the same multicast/broadcast data provided from the multiple cells participating in the SFN are synchronized with each other. In more detail, the SFN operation may be performed as a plurality of cells each having a timing error within a cyclic prefix (CP) range transmit the same data at the same time by using the same transmission mechanism (e.g., symbols, subchannels, the same frame number, the same modulation scheme, etc.).

A control channel configuration method for the MBS according to an exemplary embodiment of the present invention will now be described.

An MSCCH, which is a control channel for the MBS, is classified into a cell specific control channel and a multicast broadcast single frequency network (MBSFN) control channel. The cell specific control channel, which is for MSs located in a single cell, carries cell specific information. The cell specific control channel may be a single cell-MSCCH (SC-MSCCH). The MBSFN control channel, which is for MSs located in a plurality of cells using the same frequency band, carries information regarding multiple BS transmission. The MBSFN control channel may be a non-cell specific control channel or a multiple cell-MSCCH (MC-MSCCH).

Control information for multiple MBSs with respect to a single cell may be joint-coded in the SC-MSCCH. Namely, the multiple cell specific MBSs are provided only to a single cell, so the control information with respect to the multiple cell specific MBSs can be joint-coded into the single SC-MSCCH. For example, control information regarding intra-office broadcasting and security may be joint-coded into a single SC-MSCCH. Accordingly, signaling overhead can be reduced.

The MC-MSCCH may be configured for each service. Namely, each MBS within the MBS zone can configure the MC-MSCCH. For example, a first MC-MSCCH may be configured for radio broadcasting, and a second MC-MSCCH for DMB may be configured. In the following description, the MBS within the MBS zone may be used together with a non-cell specific MBS for multiple cells, an MBSFN service, and the like.

Figure 5:
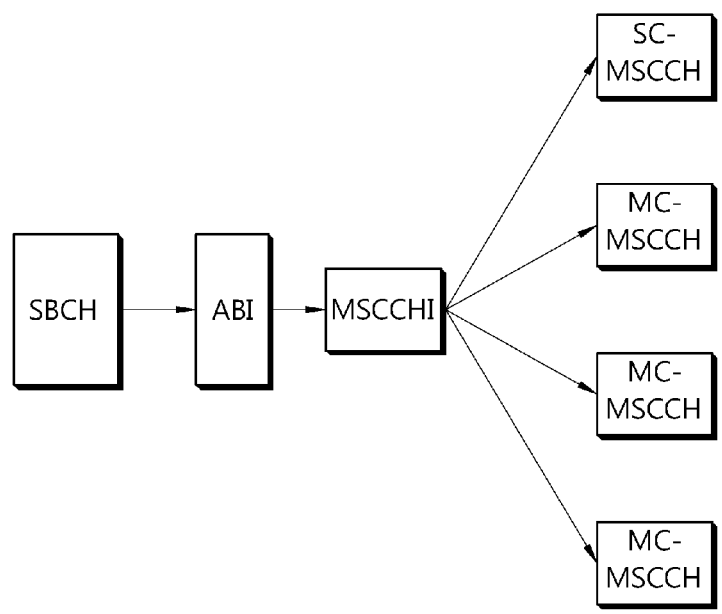
FIG. 5 illustrates a control channel configuration method for an MBS according to one exemplary embodiment of the present invention.

FIG. 5 illustrates a control channel configuration method for an MBS according to one exemplary embodiment of the present invention.

With reference to FIG. 5, a control channel (MSCCH) for an MBS is classified into a cell-specific control channel (SC-MSCCH) and a non-cell specific control channel (MC-MSCCH). When there are multiple cell specific MBSs for a single cell, control information regarding all the MBSs are joint-coded into a single SC-MSCCH. When there are multiple non-cell specific MBSs for multiple cells, an MC-MSCCH is configured for control information regarding each MBS. The non-cell specific MBSs for multiple cells may be also called an MBSFN service.

A pointer within an SBCH indicates information regarding additional broadcast information (ABI), and the ABI indicates an MSCCH indicator (MSCCHI), and the MSCCHI indicates each MSCCH. The ABI includes a system descriptor, a neighbor ABS information, paging information, and the like. In order to transmit the ABI, a MAC management message may be used. The MSCCHI may include scheduling information regarding the MSCCH, service notification information, a modification flag, and the like. Accordingly, the amount of resource allocated for the pointer within the SBCH can be reduced.

Figure 6:
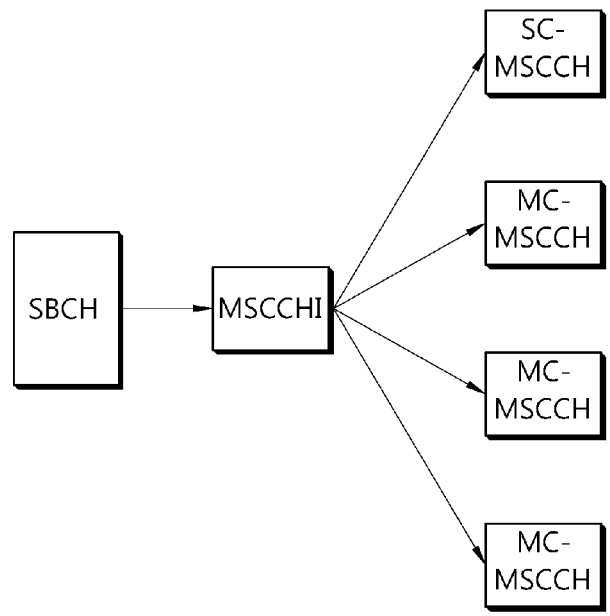
FIG. 6 illustrates a control channel configuration method for an MBS according to another exemplary embodiment of the present invention.

FIG. 6 illustrates a control channel configuration method for an MBS according to another exemplary embodiment of the present invention.

With reference to FIG. 6, a control channel (MSCCH) for an MBS is classified into a cell-specific control channel (SC-MSCCH) and a non-cell specific control channel (MC-MSCCH). When there are multiple cell specific MBSs for a single cell, control information regarding all the MBSs is joint-coded into a single SC-MSCCH. When there are multiple non-cell specific MBSs for multiple cells, an MC-MSCCH is configured for control information regarding each MBS.

A pointer within an SBCH indicates an MSCCH indicator (MSCCHI), and the MSCCHI is used to indicate each MSCCH. Or, the pointer within the SBCH may be an MSCCH indicator. The MSCCHI may include scheduling information regarding the MSCCH, service notification information, a modification flag, and the like. Because the SBCH has a pointer for each of the SC-MSCCH and the MC-MSCCH, an MS can recognize which service is provided in a cell to which the corresponding MS belongs, by decoding the SBCH. Accordingly, the MS can quickly access the MSCCH area. In order to reduce resource overhead of the SBCH, the number of MSCCHs indicated by a pointer must be considered.

Figure 7:
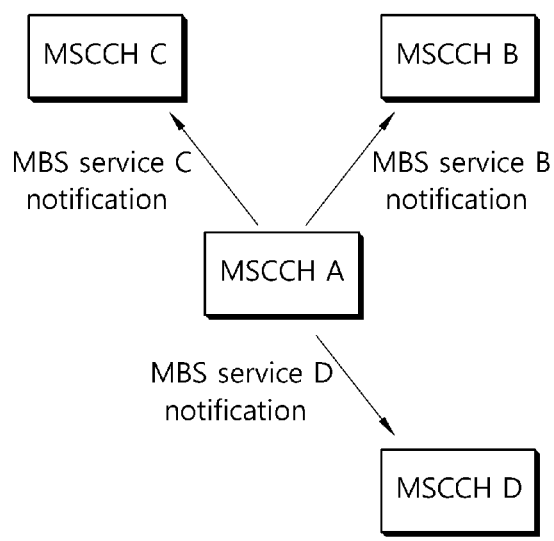
FIG. 7 illustrates an MBS notification method according to one exemplary embodiment of the present invention.

FIG. 7 illustrates an MBS notification method according to one exemplary embodiment of the present invention.

With reference to FIG. 7, other MBSs can be known by a single MSCCH. For example, an MSCCH A not only includes control information regarding an MBS A but also informs about an MBS included in an MSCCH B, an MSCCH C, and an MSCCH D. A network can allow mutually different MSCCHs to recognize mutually different MBSs indicated by a certain MSCCH. Accordingly, when a session starts, the MS may know which service a certain MSCCH indicates.

Figure 8:
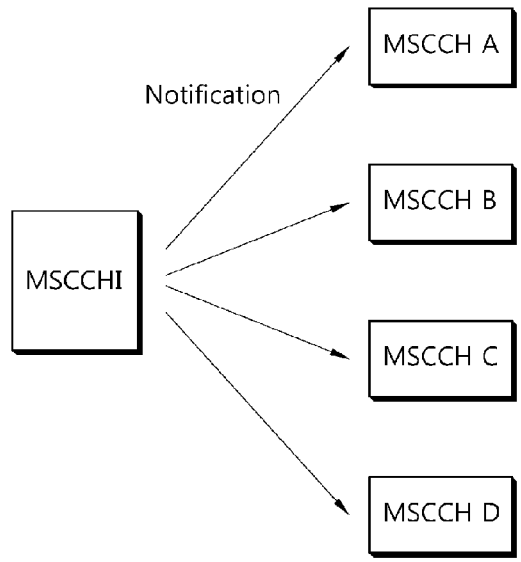
FIG. 8 illustrates an MBS notification method according to another exemplary embodiment of the present invention.

FIG. 8 illustrates an MBS notification method according to another exemplary embodiment of the present invention.

With reference to FIG. 8, a plurality of MBSs are known by an MSCCHI. Namely, the MSCCHI informs about scheduling information of each of an MSCCH A, an MSCCH B, an MSCCH C, and an MSCCH D, an MBS included in each MSCCH, and the like. Accordingly, an MS can recognize which MSCCH is used for an interested MBS, by virtue of the MSCCHI. Also, the MSCCHI provides modification information in every MSCCH regarding a serving cell.

Figure 9:
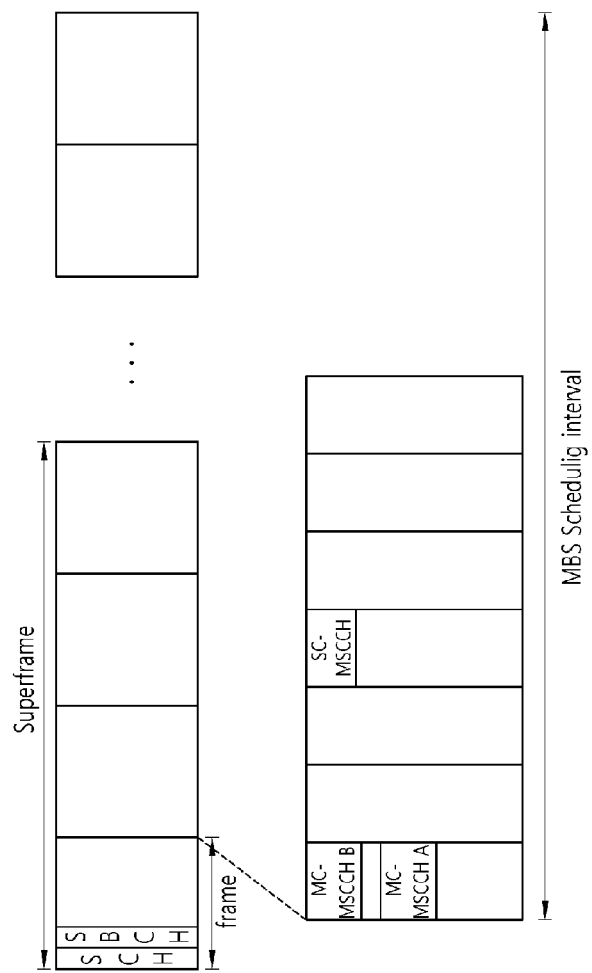
FIG. 9 illustrates a structure of a frame and control channel according to one exemplary embodiment of the present invention.

FIG. 9 illustrates a structure of a frame and control channel according to one exemplary embodiment of the present invention.

With reference to FIG. 9, all the intervals are dedicated carriers allocated for an MBS. An SBCH defines an MBS transmission period. For example, an MBS transmission period is an N superframe. An MS can match synchronization to the MBS transmission period by means of the SBCH. The SBCH may be a superframe header (SFH). An MSCCHI is a pointer indicating an SC-MSCCH and an MC-MSCCH related to a cell. The MSCCHI may include a modification flag regarding the SC-MSCCH and the MC-MSCCH. The MSCCHI may be positioned at the SBCH. The SC-MSCCH includes control information regarding an MBS for a single cell. Here, the control information with respect to an MBS may be information regarding a transmission format for decoding MBS data. The MC-MSCCH carries information related to a service transmitted to a single MBS zone including a plurality of cells. Each MC-MSCCH may be configured for each MBS. An MBS data burst having the same MBS zone ID may be multiplexed into FDM. However, an MBS data burst having a different MBS zone ID cannot be multiplexed into FDM. This is because sub-channelization patterns are different.

Figure 10:
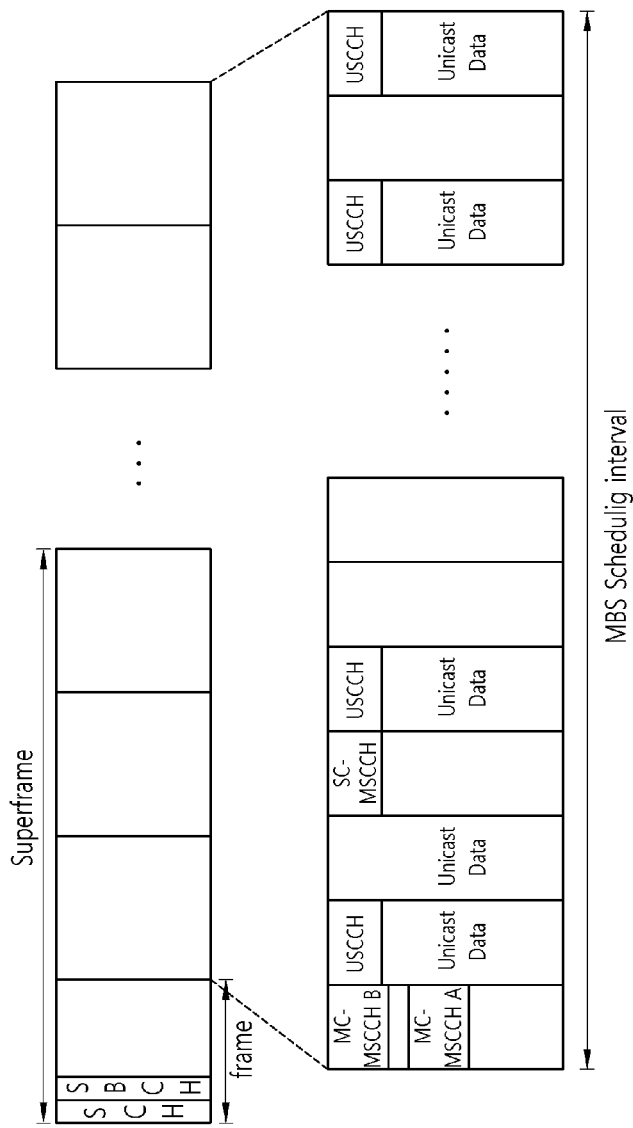
FIG. 10 illustrates a structure of a frame and control channel according to another exemplary embodiment of the present invention.

FIG. 10 illustrates a structure of a frame and control channel according to another exemplary embodiment of the present invention.

With reference to FIG. 10, a unicast/multicast mixed carrier in which an MBS uses the same frame structure as that of a unicast. A control channel and data may be multiplexed into FDM, and unicast and an MBS may be multiplexed into TDM or FDM.

When the MBS and the unicast data are multiplexed into TDM, the MBS and the unicast data are transmitted via different subframes. An MSCCHI indicates the presence, position, and an updated state of an SC-MSCCH and an MC-MSCCH related to a corresponding cell. A specific data burst for the MBS may be allocated to a subframe by means of a USCCH. When the MBS and the unicast data are multiplexed into TDM, a gain of a battery life span of an MS can be obtained. MBS data bursts having the same MBS zone ID can be multiplexed into FDM.

Figure 11:
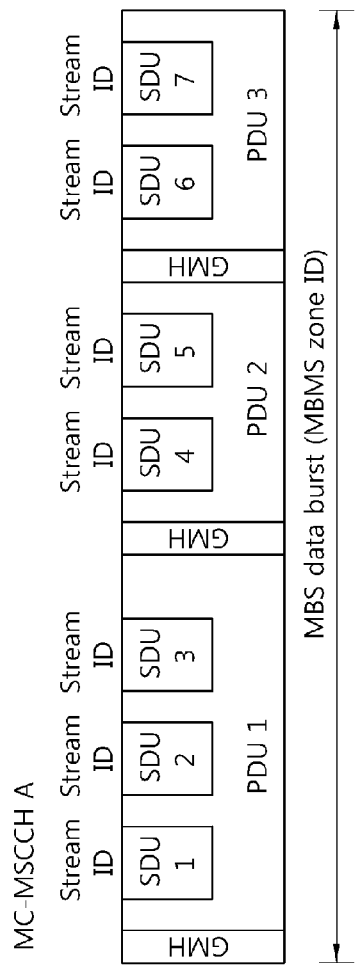
FIG. 11 illustrates a structure of an MBS data burst according to an exemplary embodiment of the present invention.

FIG. 11 illustrates a structure of an MBS data burst according to an exemplary embodiment of the present invention.

With reference to FIG. 11, an MBS data burst includes a MAC PDU including SDUs which have the same stream ID or different stream IDs corresponding to MBS contents. Each SDU may be fragmented into some SDUs present across the plurality of PDUs. The MBS data burst may be multiplexed with a data burst for a different MBS service in a time and frequency resource.

In order to strengthen a cell edge performance according to a multiple cell transmission, the same PDU may be transmitted over multiple cells. This is called an MBSFN transmission. With respect to the MBSFN transmission, each MC-MSCCH allocates an MBS data burst of the same resource having the same MBS zone ID over the multiple cells. Each stream ID has information regarding contents provided by the MBS service.

Multiplexing of MBS data and a reception load of an MS are in a trade-off relationship. As flexibility of multiplexing (e.g., TDM or FDM) increases, the reception load of the MS increases due to an increase in a duty cycle. The duty cycle refers to a rate of a time duration during which the MS is awake, and may be used together with an MBS scheduling interval. Each MBS data takes a relatively small portion of the MBS scheduling duration, the duty cycle does not greatly affect the reception load of the MS. In order to maintain a data rate required for each MBS service, the same MBS zone ID as that of the FDM and TDM of the MBS data should be considered.

Figure 12:
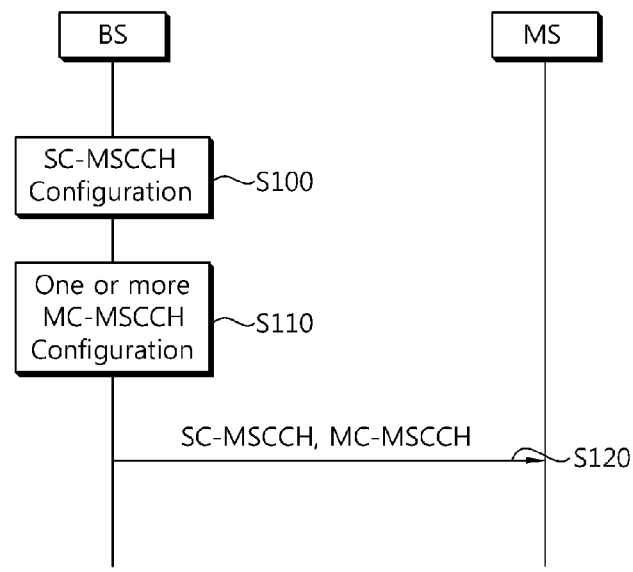
FIG. 12 is a flow chart illustrating the process of a method for transmitting a control channel for an MBS according to an exemplary embodiment of the present invention.

FIG. 12 is a flow chart illustrating the process of a method for transmitting a control channel for an MBS according to an exemplary embodiment of the present invention.

With reference to FIG. 12, a BS configures a single cell specific control channel (i.e., the SC-MSCCH) for carrying cell specific information (S100), and configures at least a single non-cell specific control channel (i.e., the MC-MSCCH A, the MC-MSCCH B, and MC-MSCCH C) for carrying non-cell specific control information (S110). The single SC-MSCCH may include a plurality of joint-coded cell specific control information. The MC-MSCCH may be configured separately for each MBS. Steps S100 and S110 may be in a temporally preceding/following relationship or may be performed at the same time.

A BS transmits one SC-MSCCH and at least one MC-MSCCH to the MS (S120). In this case, the MS may know in which MSCCH control information regarding an interested MBS exists, by virtue of a control channel indicator (i.e., an MSCCHI). The control channel indicator may include at least one of scheduling information, MBS notification information, and a modification flag with respect to the cell specific control channel and the non-cell specific control channel. The control channel indicator may be transmitted via a superframe header (SFH).

Figure 13:
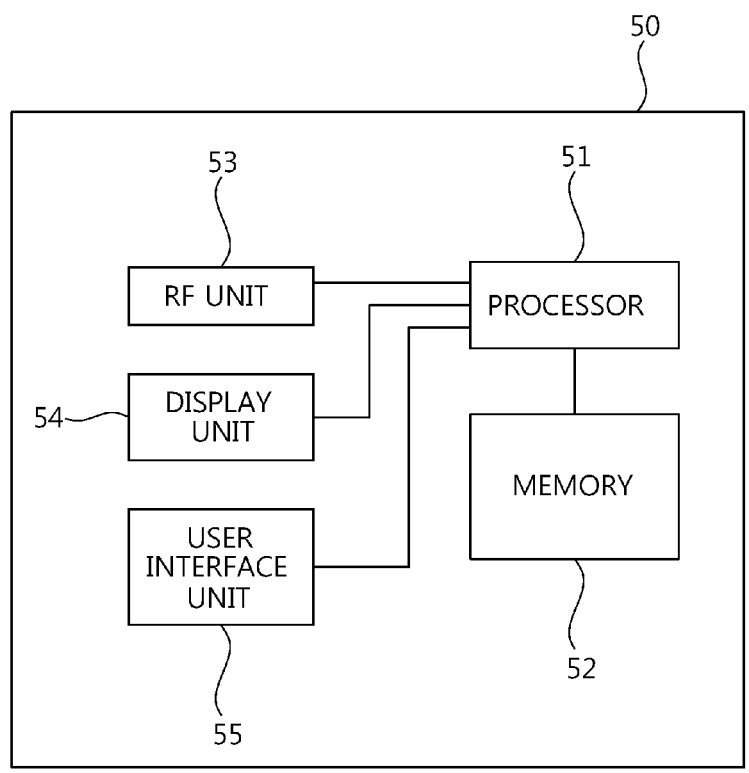
FIG. 13 is a schematic block diagram of a user equipment according to an exemplary embodiment of the present invention.

FIG. 13 is a schematic block diagram of a user equipment according to an exemplary embodiment of the present invention.

With reference to FIG. 13, an MS 50 includes a processor 51, a memory 52, a radio frequency (RF) unit 53, a display unit 54, and a user interface unit 55. The memory 52 connected with the processor 51 stores an MS driving system, an application, and a general file. The display unit 54 displays various information of the MS. As the display unit 54, a liquid crystal display (LCD), organic light emitting diodes (OLEDs), and the like, may be used. The user interface unit 55 may be configured by a combination of well known user interfaces such as a keypad, a touch screen, and the like. The RF unit 53 connected with the processor transmits and/or receives a radio signal. The processor 51 is configured to receive a control channel indicator, receives at least one of a cell-specific control channel for carrying cell specific control information and at least one non-cell specific control channel for carrying non-cell specific control information based on the control channel indicator, and receive an MBS indicated by the at least one control channel.

The present invention can be implemented by hardware, software, or their combination. In hardware implementation, the present invention can be implemented by an application specific integrated circuit (ASIC), a digital signal processor (DSP), a programmable logic device (PLD), a field programmable gate array (FPGA), a processor, a controller, a microprocessor, any other electronic units, or their combination. In software implementation, the present invention may be implemented by the modules performing the above-described functions. The software may be stored in a memory unit and executed by a processor. As the memory unit or the processor, various units well known to the skilled person in the art can be employed.

The preferred embodiments of the present invention have been described with reference to the accompanying drawings, and it will be apparent to those skilled in the art that various modifications and variations can be made in the present invention without departing from the scope of the invention. Thus, it is intended that any future modifications of the embodiments of the present invention will come within the scope of the appended claims and their equivalents.

The invention claimed is:

1. A method for transmitting a control channel for a multicast and broadcast service (MBS), the method comprising:
    configuring one cell specific control channel for carrying cell specific control information;
    configuring at least one non-cell specific control channel for carrying non-cell specific control information; and
    transmitting the cell specific control channel and the non-cell specific control channel to a mobile station,
    wherein the cell specific control channel and the non-cell specific control channel are indicated by a control channel indicator, respectively, and
    wherein the control channel indicator is transmitted via a superframe header (SFH).

2. The method of claim 1, wherein the cell specific control channel comprises a plurality of joint-coded cell specific control information.

3. The method of claim 1, wherein the non-cell specific control channel is separately configured for each MBS.

4. The method of claim 1, wherein the control channel indicator comprises at least one of scheduling information, MBS notification information, or a modification flag with respect to the cell specific control channel and the non-cell specific control channel.

5. A method of receiving a multicast and broadcast service (MBS) by a mobile station, the method comprising:
    receiving a control channel indicator;
    receiving at least one of a cell specific control channel for carrying cell specific control information and at least one non-cell specific control channel for carrying non-cell specific control information based on the control channel indicator; and
    receiving an MBS indicated by the at least one control channel,
    wherein the cell specific control channel and the non-cell specific control channel are indicated by the control channel indicator, respectively, and
    wherein the control channel indicator is received via a superframe header (SFH).

6. The method of claim 5, wherein the cell specific control channel comprises a plurality of joint-coded cell specific control information.

7. The method of claim 5, wherein the non-cell specific control channel is separately configured for each MBS.

8. A mobile station comprising:
    a processor; and
    a radio frequency (RF) unit connected with the processor and transmitting and receiving a radio signal, wherein the processor is configured to receive a control channel indicator, receive at least one of a cell specific control channel for carrying cell specific control information and at least one non-cell specific control channel for carrying non-cell specific control information based on the control channel indicator, and receive an MBS indicated by the at least one control channel,
    wherein the cell specific control channel and the non-cell specific control channel are indicated by the control channel indicator, respectively, and
    wherein the control channel indicator is received via a superframe header (SFH).

* * * * *